(12) United States Patent
Shi et al.

(10) Patent No.: US 11,221,140 B2
(45) Date of Patent: Jan. 11, 2022

(54) PRESSURE REGULATED PISTON SEAL FOR A GAS TURBINE COMBUSTOR LINER

(71) Applicant: General Electric Company, Schenectady, NY (US)

(72) Inventors: Jinjie Shi, Clifton Park, NY (US); Stephen Gerard Schadewald, Clifton Park, NY (US); Jason Paul Hoppa, West Chester, OH (US); Kirk Douglas Gallier, Liberty Township, OH (US); Christopher Edward Wolfe, Niskayuna, NY (US); Robert Proctor, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/907,013

(22) Filed: Jun. 19, 2020

(65) Prior Publication Data
US 2020/0318831 A1   Oct. 8, 2020

Related U.S. Application Data

(62) Division of application No. 15/493,549, filed on Apr. 21, 2017, now abandoned.

(51) Int. Cl.
*F23R 3/00* (2006.01)
*F23R 3/60* (2006.01)
(Continued)

(52) U.S. Cl.
CPC .............. *F23R 3/002* (2013.01); *F01D 9/023* (2013.01); *F16J 15/164* (2013.01); *F16J 15/441* (2013.01);
(Continued)

(58) Field of Classification Search
CPC .. F23R 3/002; F23R 3/60; F23R 2900/00012; F01D 9/023; F16J 15/164; F16J 15/441; F05D 2240/58; F05D 2300/6033
See application file for complete search history.

(56) References Cited

U.S. PATENT DOCUMENTS 3,698,743 A   10/1972  Sweet et al.
3,743,303 A    7/1973  Pope
(Continued)

FOREIGN PATENT DOCUMENTS

FR    2965858 A1 *  4/2012  ............ F16C 27/045

*Primary Examiner* — Ehud Gartenberg
*Assistant Examiner* — Henry Ng
(74) *Attorney, Agent, or Firm* — Venable LLP; Michele V. Frank

(57) ABSTRACT

A seal assembly to seal a gas turbine hot gas path flow at an interface of a combustor liner and a downstream component, such as a stage one turbine nozzle, in a gas turbine. The seal assembly including a piston ring seal housing, defining a cavity, and a piston ring disposed within the cavity. The piston ring disposed circumferentially about the combustor liner. The piston ring is responsive to a regulated pressure to secure sealing engagement of the piston ring and outer surface of the combustor liner. The seal assembly includes at least one of one or more sectional through-slots, bumps or channel features to provide for a flow therethrough of a high-pressure ($P_{high}$) bypass airflow exiting a compressor to the cavity. The high-pressure ($P_{high}$) bypass airflow exerting a radial force on the piston ring.

10 Claims, 18 Drawing Sheets

(51) Int. Cl.
*F01D 9/02* (2006.01)
*F16J 15/16* (2006.01)
*F16J 15/44* (2006.01)

(52) U.S. Cl.
CPC ............ *F23R 3/60* (2013.01); *F05D 2240/58* (2013.01); *F05D 2300/6033* (2013.01); *F23R 2900/00012* (2013.01)

(56) References Cited

U.S. PATENT DOCUMENTS

| | | |
|---|---|---|
| 7,413,194 B2 | 8/2008 | Wright et al. |
| 8,166,764 B2 | 5/2012 | Chokshi et al. |
| 8,276,391 B2 | 10/2012 | Berry et al. |
| 9,228,499 B2 | 1/2016 | Stryapunin |
| 2002/0074742 A1* | 6/2002 | Quoiani .............. F16J 15/0806 277/627 |
| 2004/0154303 A1 | 8/2004 | Mitchell et al. |
| 2004/0250549 A1 | 12/2004 | Liebe |
| 2008/0179837 A1 | 7/2008 | Ryan |
| 2009/0288422 A1 | 11/2009 | Cernay et al. |
| 2011/0072830 A1 | 3/2011 | Adair et al. |
| 2013/0152591 A1 | 6/2013 | Dery et al. |
| 2014/0366543 A1 | 12/2014 | Potts et al. |
| 2015/0121880 A1 | 5/2015 | Kidder et al. |
| 2016/0040886 A1 | 2/2016 | Danbjrg et al. |
| 2018/0112778 A1* | 4/2018 | Dilmaghanian ..... F16J 15/3212 |

\* cited by examiner

PRESSURE REGULATED PISTON SEAL FOR A GAS TURBINE COMBUSTOR LINER

BACKGROUND

This disclosure relates generally to turbine engine combustors and, more particularly, to a piston seal assembly for a combustor liner.

Gas turbine engines feature combustors as components. Air enters the engine and passes through a compressor. The compressed air is routed through one or more combustors. Within a combustor are one or more nozzles that serve to introduce fuel into a stream of air passing through the combustor. The resulting fuel-air mixture is ignited in the combustor by igniters to generate hot, pressurized combustion gases in the range of about 1100° C. to 2000° C. that expand through a turbine nozzle. The burned air-fuel mixture is routed out of the combustor through the turbine nozzle, which directs the flow to downstream high and low-pressure turbine stages. In these stages, the expanded hot gases exert forces upon turbine blades, thus providing additional rotational energy, for example, to drive a power-producing generator.

Turbine engine operators desire high efficiency while also achieving low emissions. At least some known turbine engines include a plurality of seal assemblies in a fluid flow path to facilitate increasing the operating efficiency of the turbine. For example, some known seal assemblies are coupled between a stationary component of the engine and a rotary component of the engine to provide sealing between a high-pressure area and a low-pressure area. In at least some known gas turbine engines, seals are provided between static components in adjacent stages, or between components within a stage.

Of particular interest is a combustor of a turbine engine, and more specifically, a combustor liner, such as ceramic matrix composite (CMC), an adjacent stage one turbine nozzle and a piston seal formed therebetween. Typically, the combustor liner includes a seal housing support on a liner aft end where it joins an adjacent stage one turbine nozzle. The piston seal is formed therebetween to provide sealing and control of the cooling bypass flow flowing between the combustor liner and the stage one turbine nozzle. The amount of cooling flow through the piston seal plays an important role in cooling the mechanical parts along the flow path. Sufficient cooling flows are necessary to assure acceptable lifetime, while too much cooling flow results in waste of compressor air.

Conventional combustor liner piston seals are typically comprised of a piston ring seal housing and a piston ring that provides for sealing between the outer surface of the combustor liner and the piston ring seal housing. Conventional piston seals often fail when the piston ring seal housing is tilted or rotated. More particularly, conventional piston seal designs typically allow for a minimal degree of rotation (tilt) of the piston ring seal housing relative to the piston ring during a takeoff condition. A relative rotation between the piston ring seal housing and piston ring of a greater degree causes the piston ring to block a gap that is required between the front wall of the piston ring seal housing and the piston ring. The gap allows for the passage therethrough of a portion of a high-pressure ($P_{high}$) compressor airflow from an upstream compressor as a high-pressure ($P_{high}$) bypass flow. The high-pressure ($P_{high}$) bypass flow ensures sufficient force acting on the piston ring to engage the piston ring on the combustor liner outer surface and on the aft wall of the piston ring seal housing, and form a seal therebetween each. In response to this blockage of the gap, the piston seal no longer seals adequately and leakage from the seal is significantly higher than desired. The lack of adequate sealing, not only wastes compressor air that passes therethrough, but may also change the heat transfer design point of the turbine engine.

Accordingly, it is desired to provide an improved piston seal for sealing between stages of a turbine, and more particularly between a combustor liner and a stage one turbine nozzle of a turbine engine. It is desired that the piston seal provide for leakage control during all flight conditions. More particularly, it is desired to provide for a piston seal responsive to relative rotation and motion of the piston ring seal housing to the piston ring or vice versa during takeoff conditions.

BRIEF DESCRIPTION

Various embodiments of the disclosure include a piston seal for a gas turbine engine, including a means for controlling such seal by pressure regulation.

In accordance with one exemplary embodiment, disclosed is a seal assembly to seal a gas turbine hot gas path flow at an interface of a combustor liner and a downstream component in a gas turbine. The seal assembly includes a piston ring seal housing and a piston ring. The piston ring seal housing has defined therein a cavity. The piston ring is disposed within the cavity of the piston ring seal housing and circumferentially about the combustor liner. The piston ring is responsive to a regulated pressure to secure sealing engagement of the piston ring and an outer surface of the combustor liner. The piston ring includes at least one arcuate seal ring segment.

In accordance with another exemplary embodiment, disclosed is a gas turbine including a combustor liner, a stage one nozzle disposed downstream of the combustor liner and a piston seal assembly defined at an interface of the combustor liner and the stage one nozzle to seal a gas turbine hot gas path flow. The piston seal assembly including a piston ring seal housing and a piston ring. The piston ring seal housing has defined therein a cavity. The piston ring is disposed within the cavity of the piston ring seal housing and circumferentially about the combustor liner. The piston ring is responsive to a regulated pressure to secure sealing engagement of the piston ring and an outer surface of the combustor liner. The piston ring includes at least one arcuate seal ring segment.

In accordance with yet another exemplary embodiment, disclosed is a gas turbine system including a compressor section, a combustor section, a turbine section and a piston seal assembly. The combustor section is coupled to the compressor section and comprising an annular combustor liner defining an annular combustion chamber coaxial with a longitudinal axis. The turbine section is coupled to the combustor section and comprising a stage one turbine nozzle positioned at the downstream end of the annular combustor liner. The piston seal assembly is defined at an interface of the annular combustor liner and the stage one nozzle to seal a gas turbine hot gas path flow. The piston seal assembly including a piston ring seal housing and a piston ring. The piston ring seal housing has defined therein a cavity. The piston ring is disposed within the cavity of the piston ring seal housing and circumferentially about the combustor liner. The piston ring is responsive to a regulated pressure to secure sealing engagement of the piston ring and an outer surface of the combustor liner, the piston ring including at least one arcuate seal ring segment.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

DRAWINGS

These and other features, aspects, and advantages of the present disclosure will become better understood when the following detailed description is read with reference to the accompanying drawings in which like characters represent like parts throughout the drawings, wherein.

Figure 30:
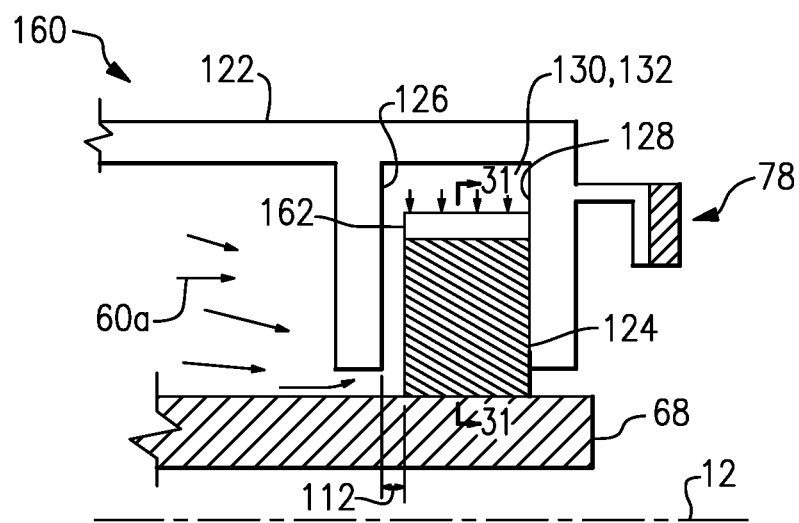
FIG. 30 is a schematic view of an embodiment of a pressure regulated piston seal assembly for a combustor liner, in accordance with one or more embodiments shown or described herein.
Figure 32:
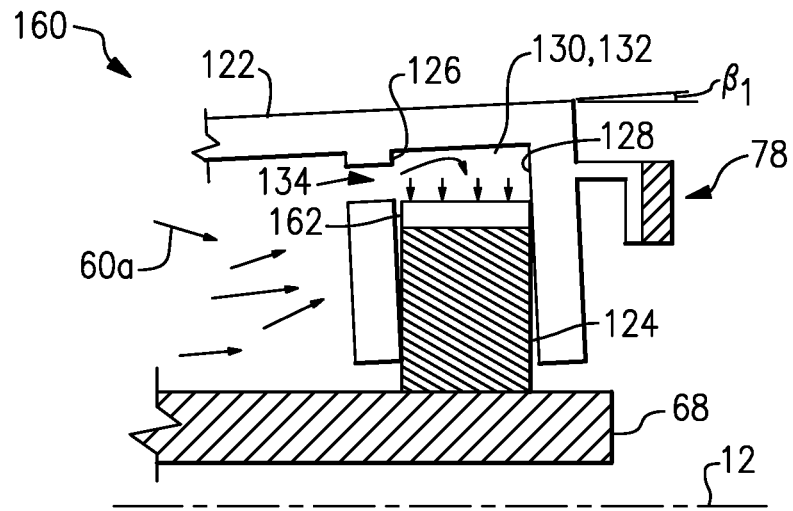
Figure 33:
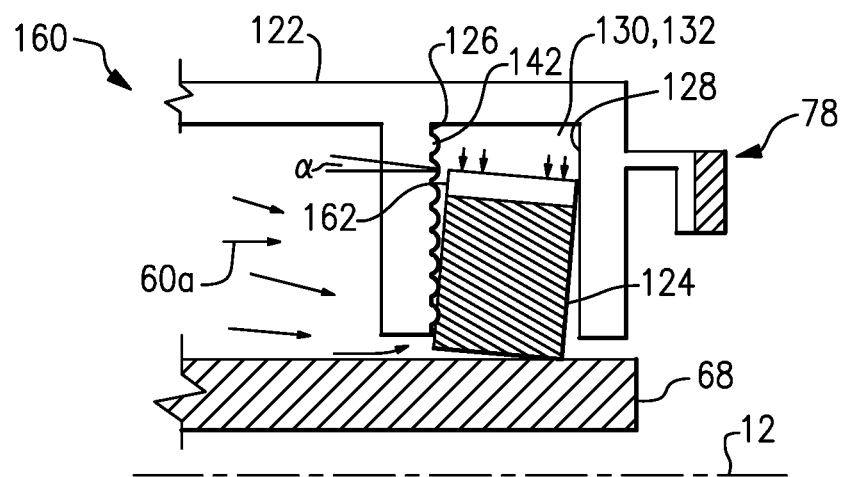

FIG. 32 is a schematic view of the pressure regulated piston seal assembly of FIG. 30, wherein the piston ring seal housing is rotated relative to the piston ring, in accordance with one or more embodiments shown or described herein; and FIG. 33 is a schematic view of the pressure regulated piston seal assembly of FIG. 30, wherein the piston ring is rotated relative to the piston ring seal housing, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged. Such ranges are identified and include all the sub-ranges contained therein unless context or language indicates otherwise.

Figure 1:
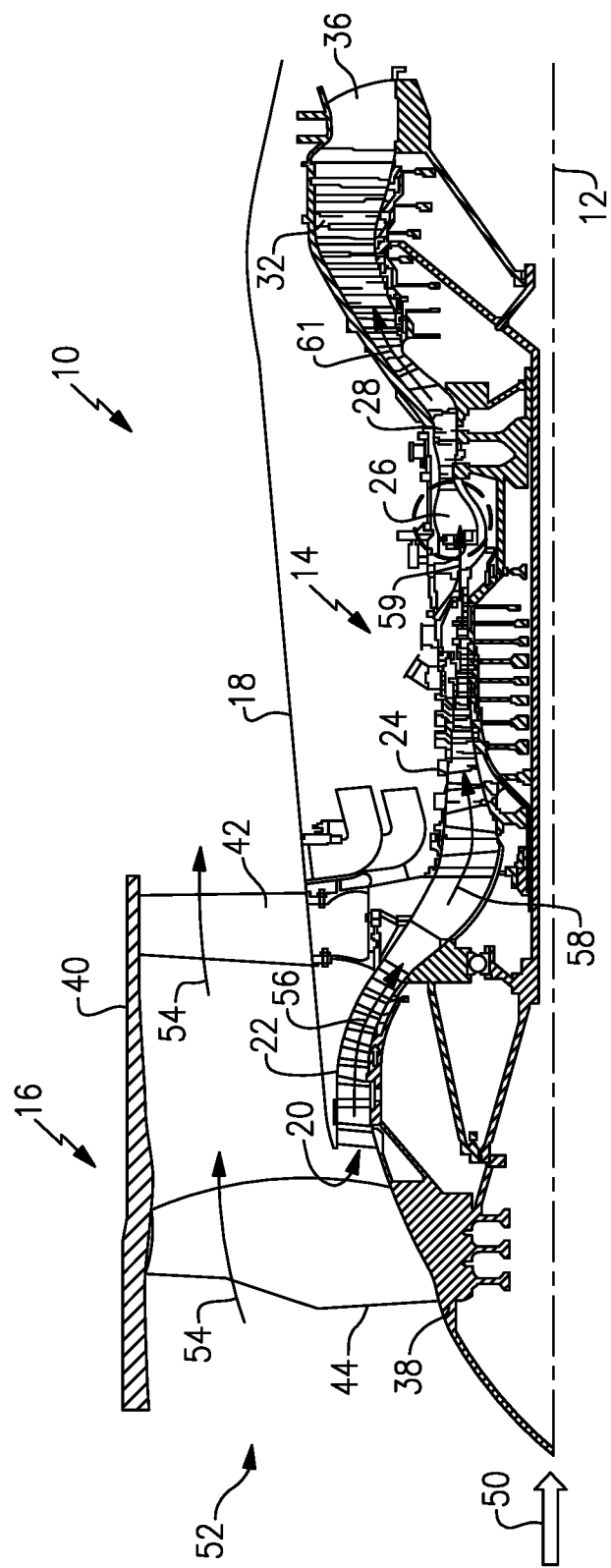
FIG. 1 is a cross sectional illustration of an aviation gas turbine engine, in accordance with one or more embodiments shown or described herein.

Referring now to the drawings wherein like numerals correspond to like elements throughout, attention is directed initially to FIG. 1 which depicts in diagrammatic form an exemplary gas turbine engine 10 utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high-pressure) turbine 28 for driving high-pressure compressor 24 through a first (high-pressure) drive shaft (not shown), and then to a second (low pressure) turbine 32 for driving booster compressor 22 and fan section 16 through a second (low pressure) drive shaft (not shown) that is coaxial with first drive shaft. After driving each of turbines 28 and 32, the combustion products leave core engine 14 through an exhaust nozzle 36.

Fan section 16 includes a rotatable, axial-flow fan rotor 38 and a plurality of fan rotor blades 44 that are surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and the plurality of fan rotor blades 44.

From a flow standpoint, it will be appreciated that an initial airflow, represented by arrow 50, enters gas turbine engine 10 through an inlet 52. Airflow 50 passes through fan blades 44 and splits into a first compressed airflow (represented by arrow 54) that moves through the fan casing 40 and a second compressed airflow (represented by arrow 56) which enters booster compressor 22. The pressure of second compressed airflow 56 is increased and enters high-pressure compressor 24, as represented by arrow 57. A high-pressure ($P_{high}$) compressor airflow 58 exiting the upstream compressor 24 flows in a downstream direction towards the combustor 26, as a high-pressure ($P_{high}$) airflow 59. After mixing with fuel and being combusted in the combustor 26, combustion products 61 exit combustor 26 and flow through first turbine 28. The combustion products 61 then flow through second turbine 32 and exit exhaust nozzle 36 to provide thrust for gas turbine engine 10.

Figure 2:
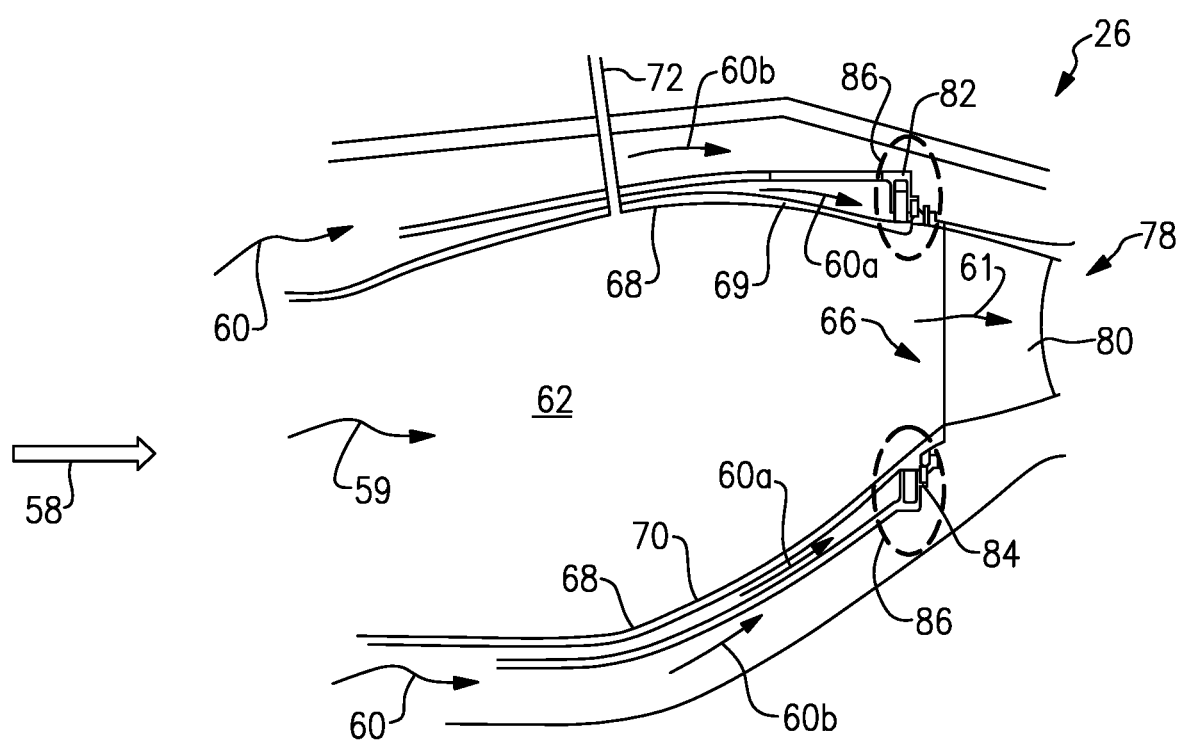
FIG. 2 is a cross sectional view of a portion of the engine of FIG. 1, including a pressure regulated piston seal assembly, in accordance with one or more embodiments shown or described herein.

Referring now to FIG. 2, illustrated is an enlargement of a portion of the gas turbine engine 10, as indicated by dashed line in FIG. 1. The combustor 26 includes an annular combustion chamber 62 that is coaxial with longitudinal axis 12 (FIG. 1), as well as an inlet (generally illustrated at 64) and an outlet 66. The combustion chamber 62 is housed within engine outer casing 18 (FIG. 1) and defined by an annular combustor liner 68, and more specifically, an annular combustor outer liner 69 and a radially-inwardly positioned annular combustor inner liner 70. Liners 69 and 70 may include those manufactured from and in a process for CMC (Ceramic Matrix Composite). As noted above, combustor 26 receives an annular stream of pressurized air, and more particularly, the high-pressure ($P_{high}$) airflow 59 via a high-pressure compressor discharge outlet (not shown). This high-pressure 59 flows into the combustor 26, where fuel is also injected from a fuel nozzle (not shown) and mixes with the high-pressure ($P_{high}$) airflow 59 from the compressor to form a fuel-air mixture that is provided to the combustion chamber 62 for combustion. Ignition of the fuel-air mixture is accomplished by a suitable igniter 72, and the resulting combustion gases 61 flow in an axial direction toward and into an annular, stage one turbine nozzle 78 positioned at the downstream end of the annular combustor outer liner 69 and the annular combustor inner liner 70. The stage one turbine nozzle 78 is defined by an annular flow channel that includes a plurality of radially-extending, circularly-spaced nozzle vanes 80 that turn the combustion gases 61 so that they flow angularly and impinge upon the first stage turbine blades of first turbine 28. The stage one turbine nozzle 78 includes a pair of flanges 82 and 84 to which the downstream end of the annular combustor outer liner 69 and the annular combustor inner liner 70, respectively, are mounted. As illustrated, a portion of the high-pressure ($P_{high}$) compressor airflow 58 flows from the compressor 24 (FIG. 1) in a downstream direction outside of the combustion liner 68, referred to herein as a high-pressure ($P_{high}$) bypass airflow 60. This high-pressure ($P_{high}$) bypass airflow 60 is intentionally meant to bypass the combustor 26 (FIG. 1) to feed a piston assembly 86 (as indicated by dotted lines in FIG. 2 and presently described) and the annular, first stage turbine nozzle 78 and provide blade cooling. More particularly, as best illustrated in FIG. 2, a portion of the high-pressure ($P_{high}$) bypass airflow 60 flows as an inner flow 60a and acts on the piston seal assembly 86. In addition, another portion of the high-pressure ($P_{high}$) bypass airflow 60 flows as an outer flow 60b, radially outward the flow 60a, around the piston seal assembly 86 to feed the turbine cooling.

The seal assembly 86 is comprised of integrated pressurized piston seals for enhanced sealing of the annular combustor outer liner 69, the annular combustor inner liner 70 and the downstream stage one turbine nozzle 78, is disclosed and described herein.

Figure 3:
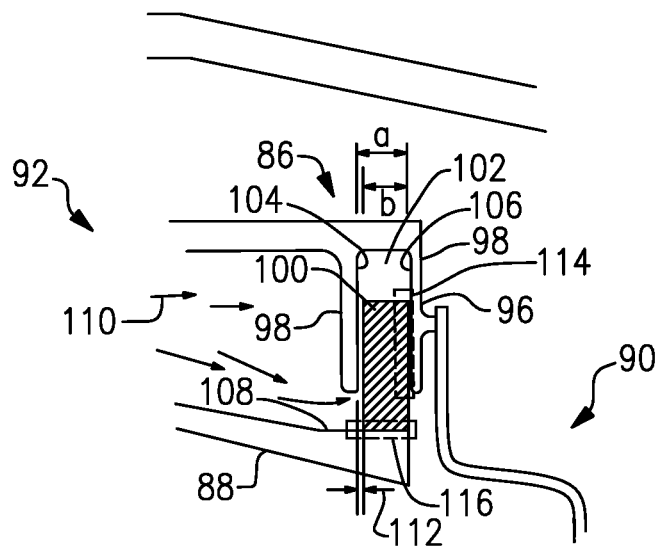
FIG. 3 is an enlarged cross sectional view of a portion of a known piston ring seal housing, having a known piston ring disposed therein, and under the influence of a high-pressure flow.
Figure 4:
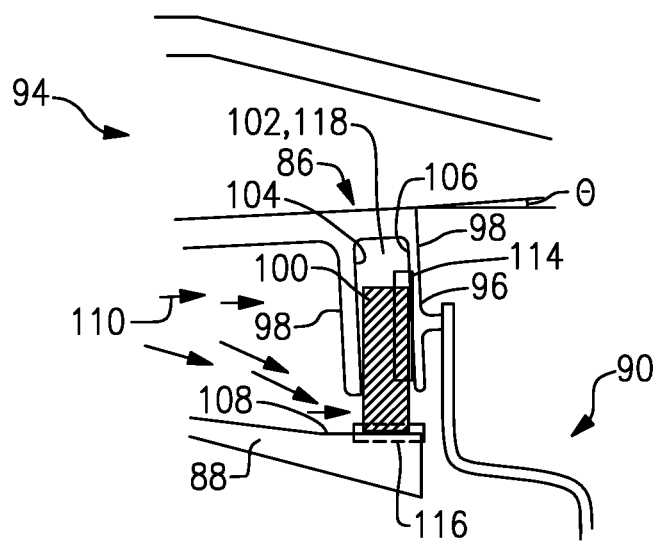
FIG. 4 is an enlarged cross sectional view of the piston ring seal housing of FIG. 3, indicating rotation (tilt) of the piston ring seal housing relative to the piston ring at a takeoff condition.

Referring now to FIGS. 3 and 4, illustrated is an enlarged portion of a known gas turbine engine, each labeled prior art, generally similar to gas turbine 10, and including a combustor liner 88, a stage one turbine nozzle 90, and a seal 86 formed therebetween and in sealing engagement with the combustor liner 88 and the stage one turbine nozzle 90. More particularly, illustrated in FIG. 3 is a seal assembly 86 during a first flight condition 92 and illustrated in FIG. 4 is the seal assembly 86 during a second flight condition 94, such as during a takeoff condition. It should be understood that only an outer radial portion of the seal assembly is illustrated and described. As illustrated, the pressurized seal assembly 86 is defined by a portion of the stage one turbine nozzle 90 and more particularly a flange 96, forming a hanger-type piston ring seal housing 98. The piston ring seal housing 98 defining a cavity 102 therebetween a front wall 104 of the piston ring seal housing 98 and a back wall 106 of the piston ring seal housing 98. A piston ring 100 is disposed therein the cavity 102 and confined, both radially and axially, by the hanger-type piston ring seal housing 98. The piston ring seal housing 98, and more particularly the cavity 102, includes an axial dimension "a" that is greater than an axial dimension "b" of the piston ring 100. The piston ring 100 is generally configured of a single seal segment, or multiple arcuate seal segments, and more particularly as a 360-degree circular ring that encloses an outer surface 108 of the combustor liner 88 and defines the seal 86 at the downstream end of the combustor liner 88. As used herein, the term "arcuate" may refer to a member, component, part, etc. having a curved or partially curved shape.

During the first flight condition 92, a high-pressure ($P_{high}$) bypass airflow 110 of compressor air, similar to the high-pressure ($P_{high}$) bypass airflow 60a of FIG. 2, pushes the piston ring 100 against the back wall 106 of the piston ring seal housing 98. As illustrated, in that the piston ring seal housing 98 is wider than the piston ring 100, a front gap 112 is formed between the front wall 104 of the piston ring seal housing 98 and the piston ring 100 when the piston ring 100 is pushed against the back wall 106 of the piston ring seal housing 98. As the high-pressure ($P_{high}$) bypass airflow 110 enters the piston ring seal housing 98 via the front gap 112 it results in a pressure drop cross the piston ring 100 in the radial direction. This radial pressure drop on the piston ring 100 assures the seal of a leakage path 116, as indicated by dashed line, between the piston ring 100 and the outer surface 108 of the combustor liner 88. In addition, the high-pressure ($P_{high}$) bypass airflow 110 pushes the piston ring 100 against the back wall 106 sealing the contact between the piston ring 100 and the back wall 106 of the piston ring seal housing 98, assuring the seal of a leakage path 114, as indicated by dashed line.

During the second flight condition 94, such as during a takeoff stage of operation, the piston ring seal housing 98 is rotated relative to the longitudinal axis 12 (FIG. 1), and more particularly the combustor liner 88, due to high thermal gradient across the piston ring seal housing 98 in radial direction. In the illustrated embodiment of FIG. 4, the piston ring seal housing 98 is rotated at a degree "θ", wherein θ≠0 degrees. The rotation of the piston ring seal housing 98 results in a blockage of the gap 112 resulting in a lack of pressure drop across the piston ring 100 in the radial direction. The main reason for piston seal failure is due to this blockage of the gap 112 between the piston ring 100 and the front wall 104 of the piston ring seal housing 98, resulting in the high-pressure ($P_{high}$) bypass airflow 110 not being present on the top of the piston ring 100 and lack of sufficient radially-inward force to engage the piston ring 100 on the outer surface 108 of the combustor liner 88. As illustrated, the rotation of the piston ring seal housing 98 and resulting closure of the gap 112 will result in the piston ring 100 no longer engaging with combustor liner 88 causing the seal to fail. In an embodiment, where the tilt is minimal, the piston ring 100 will not block the gap 112 and the high-pressure ($P_{high}$) bypass airflow 110 from entering an upper portion 118 of the cavity 102.

Referring now to FIGS. 5-31, illustrated are embodiments of a pressure-regulated piston seal assembly according to this disclosure. It is again noted, that like numbers represent like elements throughout the embodiments. As described, the seal assembly will provide for sealing engagement during all flight conditions, and in particular, during takeoff flight conditions whereby the piston ring seal housing and the piston ring are rotated, relative to one another. In the illustrated embodiments, each pressure-regulated seal assembly configuration is illustrated wherein the piston ring seal housing is rotated, relative to the longitudinal axis, and wherein the piston ring is rotated relative to the longitudinal axis.

Furthermore, in the embodiments of FIGS. 5-31, the pressure-regulated piston seal assembly is defined by a portion of the stage one turbine nozzle 78, the hanger-type piston ring seal housing 122 and the piston ring 124. The piston ring seal housing 122 defining a cavity 132 therebetween a front wall 126 of the piston ring seal housing 122 and a back wall 128 of the piston ring seal housing 122. The piston ring 124 is disposed therein the cavity 132 and confined, both radially and axially, by the hanger-type piston ring seal housing 122. As previously described with regard to FIGS. 3 and 4, in an embodiment the piston ring seal housing 122, and more particularly the cavity 132, includes an axial dimension "a" that is greater than an axial dimension "b" of the piston ring 124. In some embodiments, the cavity 132 has an axial dimension "a" of approximately 1 millimeter to approximately 10 millimeters. In some embodiments, the piston ring 124 has an axial dimension "b" of approximately 1 millimeter to approximately 10 millimeters. The piston ring 124 is generally configured as a single component or segment, or multiple arcuate segments, and more particularly as a 360-degree circular ring that encloses an outer surface 136 of the combustor liner 68 and defines a seal at the downstream end of the combustor liner 68. As used herein, the term "arcuate" may refer to a member, component, part, etc. having a curved or partially curved shape. As disclosed herein, in a preferred embodiment the combustor liner 68 is fabricated with ceramic matrix composites (CMCs).

As previously indicated, in advanced gas path (AGP) heat transfer designs for gas turbine engines, the arcuate components, and in particular the shrouds, nozzles, and the like, are fabricated with ceramic matrix composites (CMCs). Similar to seal assemblies used in conventional designs, the AGP components utilize static seals of various types of construction (e.g. solid, laminate, shaped, etc.). The static seals are typically made of a high temperature metal material, such as nickel alloy. The CMC material that forms many of the AGP components has a lower co-efficient of thermal expansion (CTE) compared to the static seals formed of the high temperature metal.

Referring specifically to FIGS. 5-8, illustrated are embodiments of a pressure-regulated seal assembly, generally referenced 120. The seal assembly 120 is generally defined by a portion of the stage one nozzle 78, as previously introduced in FIG. 2, a piston ring seal housing 122 and a piston ring 124. Similar to the previously described known art of FIGS. 3 and 4, the piston ring seal housing 122 is wider than the piston ring 124, and defines a front gap (not shown) between a front wall 126 of the piston ring seal housing 122 and the piston ring 124 when the piston ring 124 is pushed against a back wall 128 of the piston ring seal housing 122.

Figure 5:
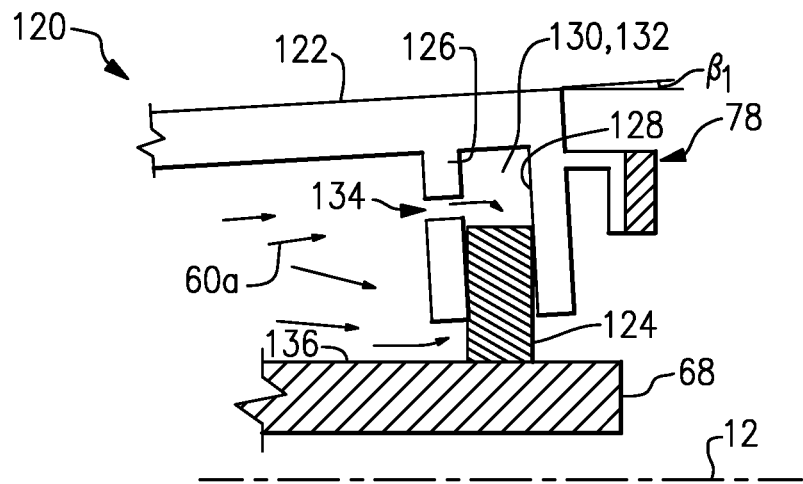
FIG. 5 is a schematic view of an embodiment of a pressure regulated piston seal assembly for a combustor liner, wherein the piston ring seal housing is rotated relative to the piston ring and wherein one or more sectional through-slots are located on an upstream portion of the piston ring seal housing, in accordance with one or more embodiments shown or described herein.
Figure 9:
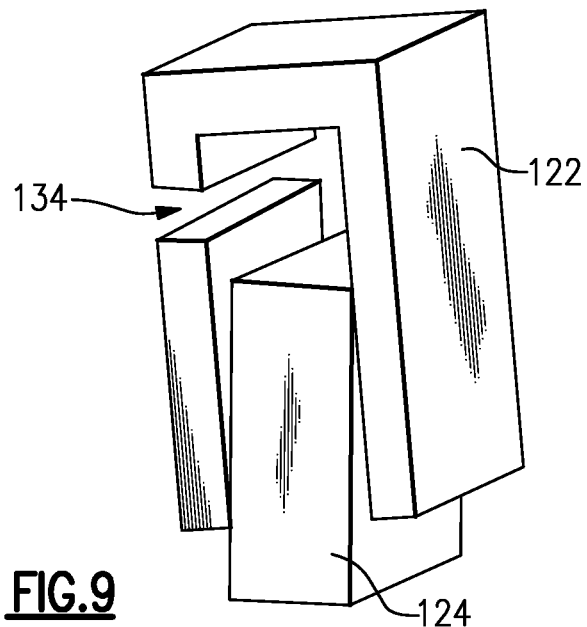
FIG. 9 is a schematic view of a portion of the pressure regulated piston seal assembly of FIG. 5, wherein the piston ring seal housing is rotated relative to the piston ring, in accordance with one or more embodiments shown or described herein.
Figure 10:
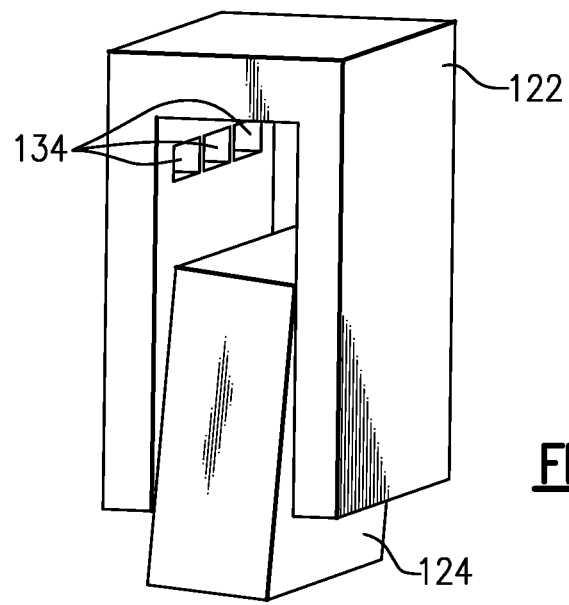
FIG. 10 is a schematic view of a portion of the pressure regulated piston seal assembly of FIG. 6, wherein the piston ring is rotated relative to the piston ring seal housing, in accordance with one or more embodiments shown or described herein.

During a first flight condition (not shown), as a portion of the high-pressure ($P_{high}$) compressor airflow 58 from the compressor 24 (FIG. 1), and more particularly an inner flow of a high-pressure ($P_{high}$) bypass airflow 60a enters the piston ring seal housing 122 via the gap, generally similar to gap 112 of FIGS. 3 and 4, it results in a pressure drop cross the piston ring 124 in the radial direction, thereby engaging the piston ring 124 with the combustor liner 68 and the piston ring seal housing 122, as previously described. In contrast, during a second operating condition, as best illustrated in FIG. 5, such as during a takeoff condition, the piston ring seal housing 122 is rotated at an angle "$\beta_1$" relative to the piston ring 124, and more specifically the longitudinal axis 12, due to the high thermal gradient across the piston ring seal housing 98 in the radial direction. In an embodiment, $\beta_1 \neq 0$ degrees. In this instance, the piston ring 124 blocks the gap (not shown) and thus the pathway allowing the inner flow of the high-pressure ($P_{high}$) bypass airflow 60a to enter an upper portion 130 of a cavity 132 defined between the front wall 126 and the back wall 128 of the piston ring seal housing 122. The piston ring 124 no longer engages with combustor liner 68 due to the lack of the inner flow of the high-pressure ($P_{high}$) bypass airflow 60a into the cavity 132, and the seal fails. To address such rotation of the piston ring seal housing 122 during the second flight condition, one or more sectional through-slots 134 are provided in the front wall 126 of the piston ring seal housing 122, following a 360-degree circular contour. The one or more sectional through-slots 134 may be configured a single continuous through-slot 134, as best illustrated in FIG. 9 or as a plurality of through-slots 134 as best illustrated in FIG. 10. The one or more sectional through-slots 134 provide an opening to the upper portion 130 of the cavity 132. The one or more sectional through-slots 134 guide the inner flow of the high-pressure ($P_{high}$) bypass airflow 60a directly to a top of the piston ring 124 and assure engagement of the piston ring 124 with an outer surface 136 of the combustor liner 68 regardless of the degree of rotation of the piston ring seal housing 122. In an embodiment, the one or more sectional through-slots 134 may be manufactured together with the front wall 104 of the piston ring seal housing 122 and no further changes are required for the parts assembly.

Figure 6:
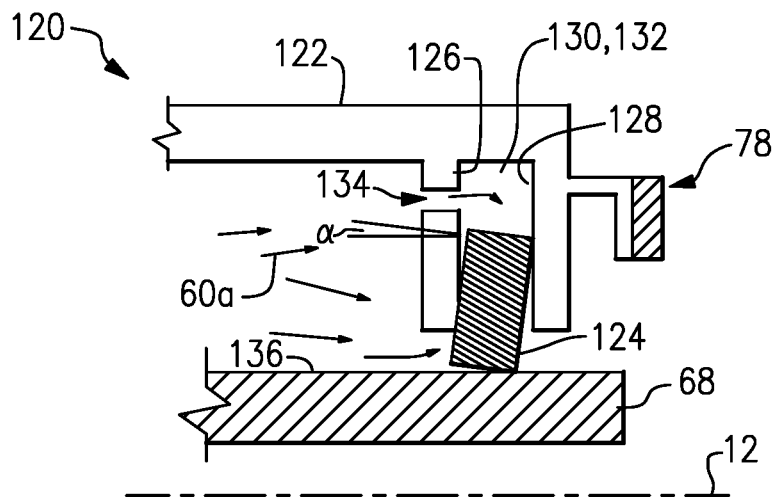
FIG. 6 is a schematic view of the pressure regulated piston seal assembly of FIG. 5, wherein the piston ring is rotated relative to the piston ring seal housing and wherein one or more sectional through-slots are located on an upstream portion of the piston ring seal housing, in accordance with one or more embodiments shown or described herein.

Referring now to FIG. 6, in an embodiment the piston ring 124 may rotate relative to the piston ring seal housing 122, and more particularly the longitudinal axis 12, such as during the second operating condition. In this particular embodiment, the piston ring 124 is rotated at an angle "$\alpha$" relative to the piston ring seal housing 122, and more specifically the longitudinal axis 12, due to thermal stresses. In an embodiment $\alpha \neq 0$ degrees. Similar to the embodiment of FIG. 6, in this instance, the piston ring 124 will block the pathway of the inner flow of the high-pressure ($P_{high}$) bypass airflow 60a from entering an upper portion 130 of the cavity 132 defined between the front wall 126 and the back wall 128 of the piston ring seal housing 122. The lack of inner flow of the high-pressure ($P_{high}$) bypass airflow 60a into the cavity 132 causes the piston ring 124 to no longer engage with combustor liner 68 and the seal fails. To address such rotation of the piston ring 124 during the second flight condition, one or more sectional through-slots 134 provided in the front wall 126 of the piston ring seal housing 122, similar to the embodiment of FIG. 5, are provided following a 360-degree circular contour and configured as previously described. The one or more sectional through-slots 134 provide an opening to the upper portion 130 of the cavity 132. The one or more sectional through-slots 134 guide the inner flow of the high-pressure ($P_{high}$) bypass airflow 60a directly to the top of the piston ring 124 and assure engagement of the piston ring 124 with the outer surface 136 of the combustor liner 68 regardless of the degree of rotation of the piston ring 124.

Figure 7:
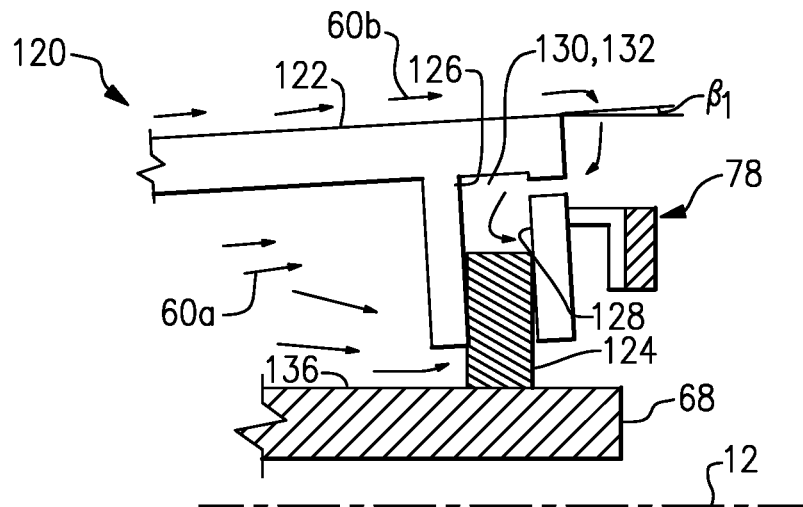
FIG. 7 is a schematic view of the pressure regulated piston seal assembly of FIG. 5, wherein the piston ring seal housing is rotated relative to the piston ring and wherein one or more sectional through-slots are located on a downstream portion of the piston ring seal housing, in accordance with one or more embodiments shown or described herein.
Figure 8:
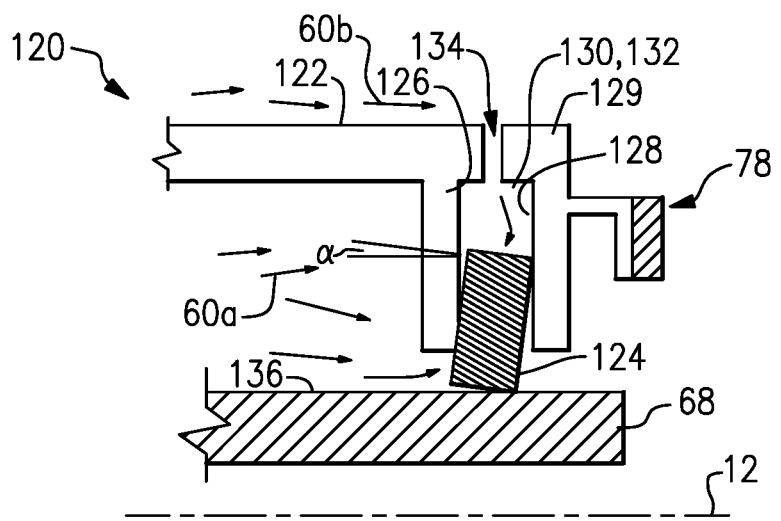
FIG. 8 is a schematic view of the pressure regulated piston seal assembly of FIG. 5, wherein the piston ring is rotated relative to the piston ring seal housing and wherein one or more sectional through-slots are located on an outermost radial face of the piston ring seal housing, in accordance with one or more embodiments shown or described herein.

Referring now to FIGS. 7 and 8, in an embodiment, as previously described, a portion of the high-pressure ($P_{high}$) bypass airflow 60 flows through a window (not shown) in a support leg that supports the piston ring seal housing 122. As a result, an outer flow of the high-pressure ($P_{high}$) bypass airflow 60b passes through one or more sectional through-slots 134 formed on the aft face, or back wall 128, of the piston ring seal housing 122, as best illustrated in FIG. 7. In the embodiment of FIG. 8, the outer flow of the high-pressure ($P_{high}$) bypass airflow 60b passes through one or more sectional through-slots 134 formed on an outermost radial face 129 of the piston ring seal housing 122. It is noted that the configurations of FIGS. 7 and 8 may be advantageous over the embodiment of FIGS. 5 and 6 where there is limited room for the one or more sectional through-slots 134 on the forward face 126.

Referring now to FIGS. 11-18, illustrated is a second embodiment of a pressure-regulated seal assembly, generally referenced 140. The seal assembly 140 is generally defined by a portion of the stage one nozzle 78, as previously introduced in FIG. 2, a piston ring seal housing 122 and a piston ring 124. Similar to the previously described known art of FIGS. 3 and 4, the piston ring seal housing 122 is wider than the piston ring 124, and defines a front gap (not shown) between a front wall 126 of the piston ring seal housing 122 and the piston ring 124 when the piston ring 124 is pushed against a back wall 128 of the piston ring seal housing 122.

Figure 11:
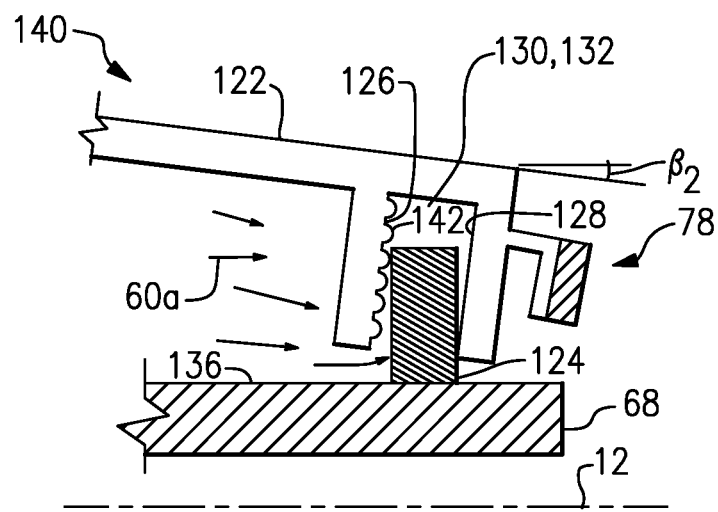
FIG. 11 is a schematic view of another embodiment of a pressure regulated piston seal assembly for a combustor liner, wherein the piston ring seal housing is rotated relative to the piston ring, in accordance with one or more embodiments shown or described herein.
Figure 13:
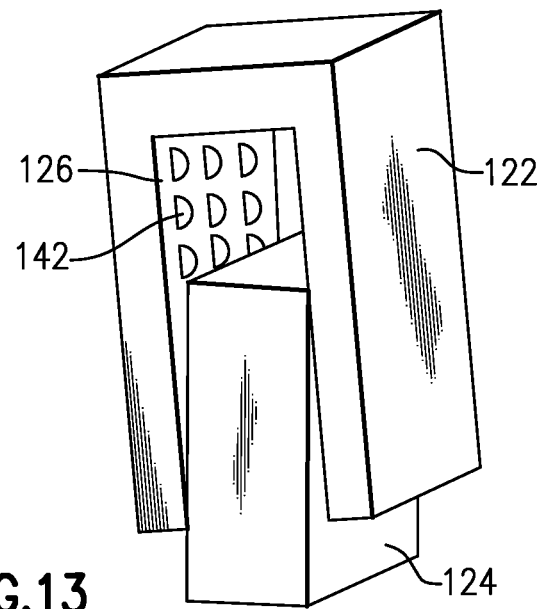
FIG. 13 is a schematic view of a portion of the pressure regulated piston seal assembly of FIG. 11, wherein the piston ring seal housing is rotated relative to the piston ring, in accordance with one or more embodiments shown or described herein.
Figure 15:
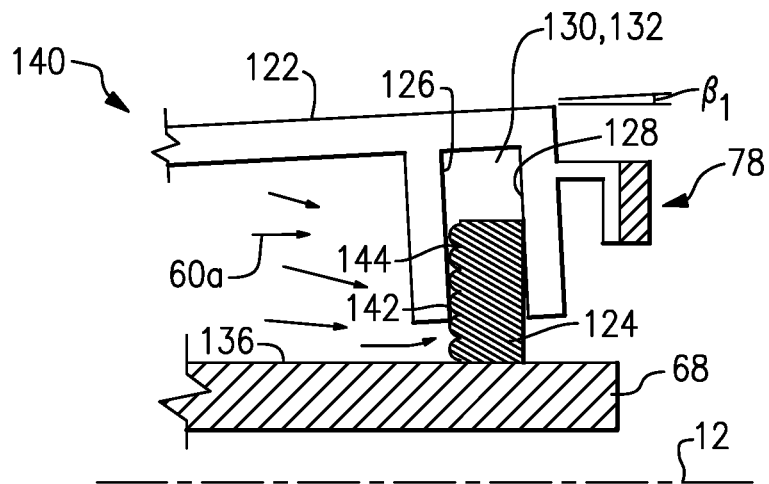
FIG. 15 is a schematic view of an embodiment of a pressure regulated piston seal assembly for a combustor liner, wherein the piston ring seal housing is rotated relative to the piston ring, in accordance with one or more embodiments shown or described herein.

During a first flight condition (not shown), as the inner flow of the high-pressure ($P_{high}$) bypass airflow 60a enters the piston ring seal housing 122 via the gap, it results in a pressure drop cross the piston ring 124 in the radial direction, thereby engaging the piston ring 124 with the combustor liner 68 and the piston ring seal housing 122, as previously described. In contrast, during a second operating condition, as best illustrated in FIGS. 11, 13 and 15, such as during a takeoff condition, the piston ring seal housing 122 is rotated at an angle relative to the piston ring 124, and more specifically the longitudinal axis 12, due to the high thermal gradient across the piston ring seal housing 98 in the radial direction. As best illustrated in FIG. 11, the piston ring seal housing 122 is rotated at an angle "$\beta_2$" relative to the piston ring 124, and more specifically the longitudinal axis 12. In this particular embodiment, it is noted the piston ring seal housing 122 is rotated in generally an opposed direction to that of the previous embodiment. In an embodiment, $\beta_2 \neq 0$ degrees. In the embodiments of FIGS. 13 and 15, the piston ring seal housing 122 is rotated at an angle "$\beta_1$" relative to the piston ring 124, and more specifically the longitudinal axis 12. It is additionally noted the piston ring seal housing 122 may have a direction of rotation of either $\beta_1$ or $\beta_2$ in each of the disclosed embodiments.

Figure 14:
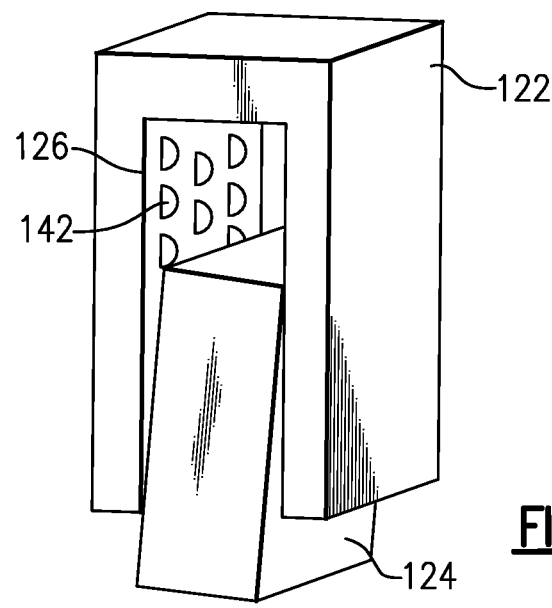
FIG. 14 is a schematic view of a portion of the pressure regulated piston seal assembly of FIG. 12, wherein the piston ring is rotated relative to the piston ring seal housing, in accordance with one or more embodiments shown or described herein.
Figure 17:
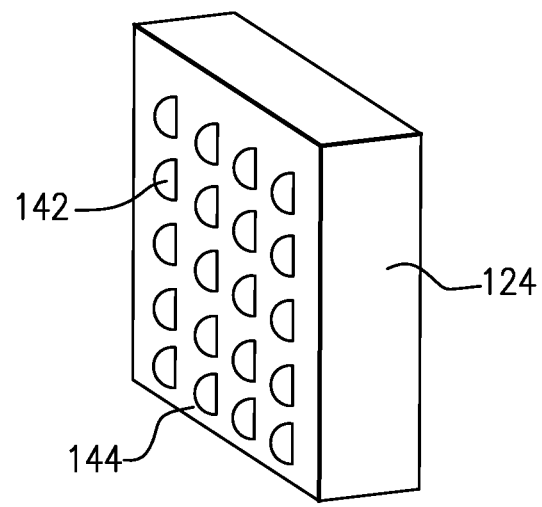
FIG. 17 is a schematic view of a piston ring of FIGS. 15 and 16, in accordance with one or more embodiments shown or described herein.
Figure 18:
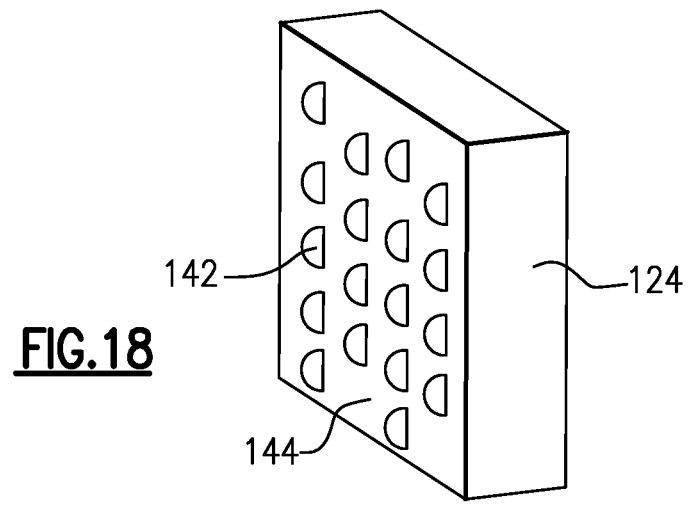
FIG. 18 is a schematic view of another embodiment of the piston ring of FIGS. 15 and 16, in accordance with one or more embodiments shown or described herein.

As illustrated, the piston ring 124 will block the inner flow of the high-pressure ($P_{high}$) bypass airflow 60a from the compressor 24 (FIG. 1) from entering an upper portion 130 of a cavity 132 defined between the front wall 126 and the back wall 128 of the piston ring seal housing 122. The lack of inner flow of the high-pressure ($P_{high}$) bypass airflow 60a into the cavity 132 causes the piston ring 124 to no longer engage with combustor liner 68 and the seal fails. To address such rotation of the piston ring seal housing 122 during the second flight condition, a plurality of local bumps 142 are provided on the front wall 126 of the piston ring seal housing 122, as best illustrated in FIGS. 11-14, or on an upstream surface 144 of the piston ring 124 as best illustrated in FIGS. 15-18. As illustrated in FIGS. 11-14, the plurality of local bumps 142 extend or protrude therefrom the front wall 126 of the piston ring seal housing 122. The plurality of local bumps 142 provides a flow opening therebetween to the upper portion 130 of the cavity 132. The plurality of local bumps 142 thus guide the inner flow of the high-pressure ($P_{high}$) bypass airflow 60a directly to top of the piston ring 124 and assure engagement of the piston ring 124 with an outer surface 136 of the combustor liner 68 regardless of the degree of rotation of the piston ring seal housing 122. In an embodiment, the one or more local bumps 142 may be configured in a plurality of columns and rows, as best illustrated in FIGS. 13 and 17. In an embodiment, the one or more local bumps 142 may be configured in a plurality of columns and offset rows, as best illustrated in FIGS. 14 and 18. In an embodiment, the plurality of local bumps 142 may be manufactured together with the front wall 104 of the piston ring seal housing 122 and/or the upstream surface 144 of the piston ring 124 and no further changes are required for the parts assembly.

Figure 12:
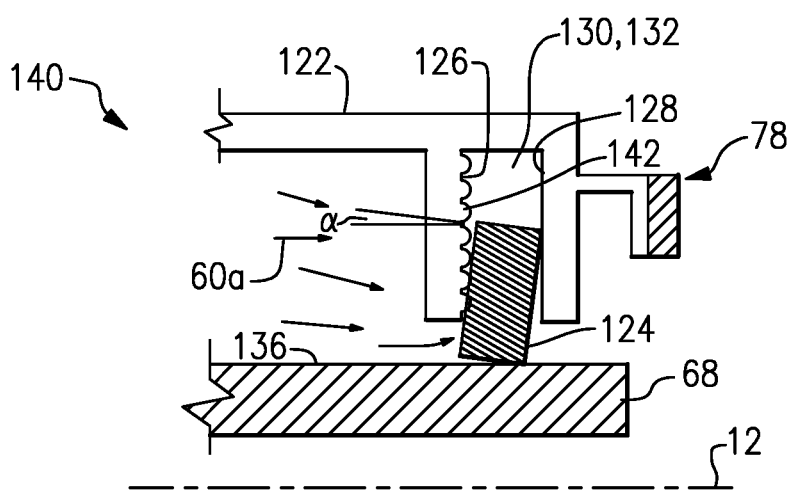
FIG. 12 is a schematic view of the pressure regulated piston seal assembly of FIG. 11, wherein the piston ring is rotated relative to the piston ring seal housing, in accordance with one or more embodiments shown or described herein.
Figure 16:
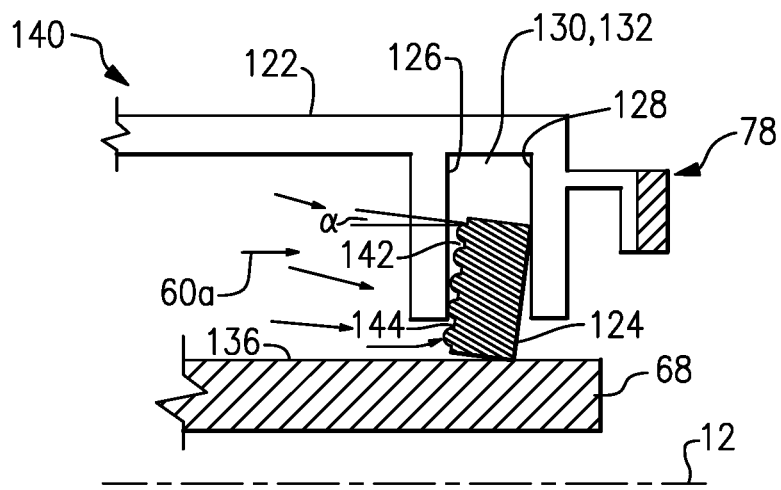
FIG. 16 is a schematic view of the pressure regulated piston seal assembly of FIG. 15, wherein the piston ring is rotated relative to the piston ring seal housing, in accordance with one or more embodiments shown or described herein.

Referring more particularly to FIGS. 12, 14 and 16, in an embodiment the piston ring 124 may rotate relative to the piston ring seal housing 122, and more particularly the longitudinal axis 12, such as during the second operating condition. In this particular embodiment, the piston ring 124 is rotated at an angle "$\alpha$" relative to the piston ring seal housing 122, and more specifically the longitudinal axis 12, due to thermal stresses. As previously indicated $\alpha \neq 0$ degrees. Similar to the embodiment of FIG. 6, in this instance, the piston ring 124 will block the inner flow of the high-pressure ($P_{high}$) bypass airflow 60a from entering an upper portion 130 of a cavity 132 defined between the front wall 126 and the back wall 128 of the piston ring seal housing 122. The lack of inner flow of the high-pressure ($P_{high}$) bypass airflow 60a into the cavity 132 causes the piston ring 124 to no longer engage with the combustor liner 68 and the seal fails. To address such rotation of the piston ring 124 during the second flight condition, the plurality of local bumps 142 are configured to extend therefrom the upstream surface 144 of the piston ring 124. The plurality of local bumps 142 provide a flow opening to the upper portion 130 of the cavity 132. The plurality of local bumps 142 guide inner flow of the high-pressure ($P_{high}$) bypass airflow 60a directly to top of the piston ring 124 and assure engagement of the piston ring 124 with an outer surface 136 of the combustor liner 68 regardless of the degree of rotation of the piston ring 124.

Referring now to FIGS. 19-29, illustrated is a third embodiment of a pressure-regulated seal assembly, generally referenced 150. The seal assembly 150 is generally defined by a portion of the stage one nozzle 78, as previously introduced in FIG. 2, a piston ring seal housing 122 and a piston ring 124. Similar to the previously described known art of FIGS. 3 and 4, the piston ring seal housing 122 is wider than the piston ring 124, and defines a front gap (not shown) between a front wall 126 of the piston ring seal housing 122 and the piston ring 124 during when the piston ring 124 is pushed against a back wall 128 of the piston ring seal housing 122.

Figure 19:
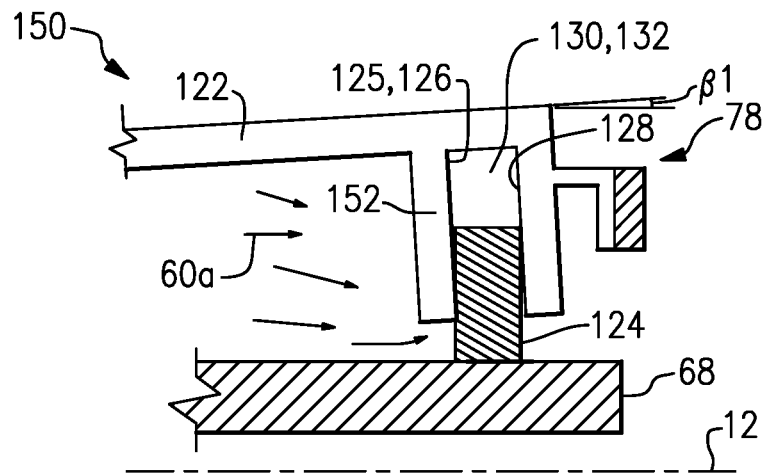
FIG. 19 is a schematic view of an embodiment of a pressure regulated piston seal assembly for a combustor liner, wherein the piston ring seal housing is rotated relative to the piston ring, in accordance with one or more embodiments shown or described herein.
Figure 20:
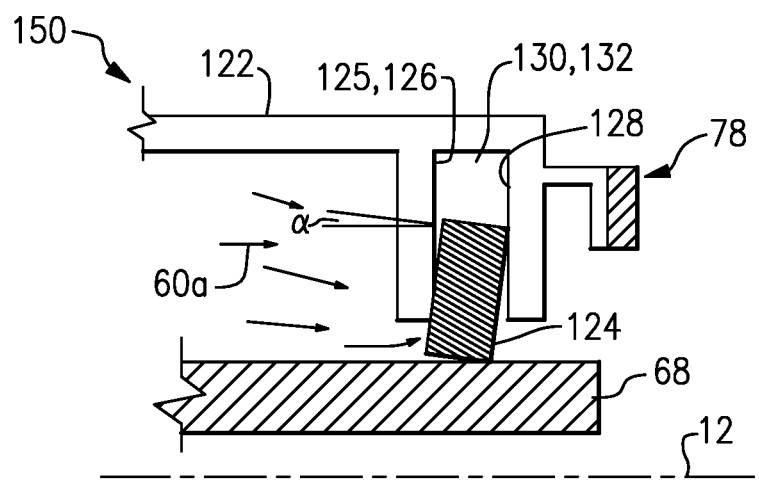
FIG. 20 is a schematic view of the pressure regulated piston seal assembly of FIG. 19, wherein the piston ring is rotated relative to the piston ring seal housing, in accordance with one or more embodiments shown or described herein.
Figure 21:
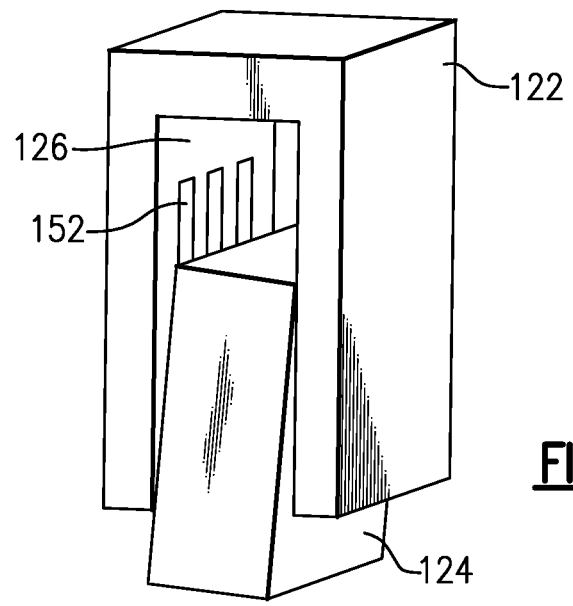
FIG. 21 is a schematic view of a portion of the pressure regulated piston seal assembly of FIG. 20, wherein the piston ring is rotated relative to the piston ring seal housing, in accordance with one or more embodiments shown or described herein.
Figure 22:
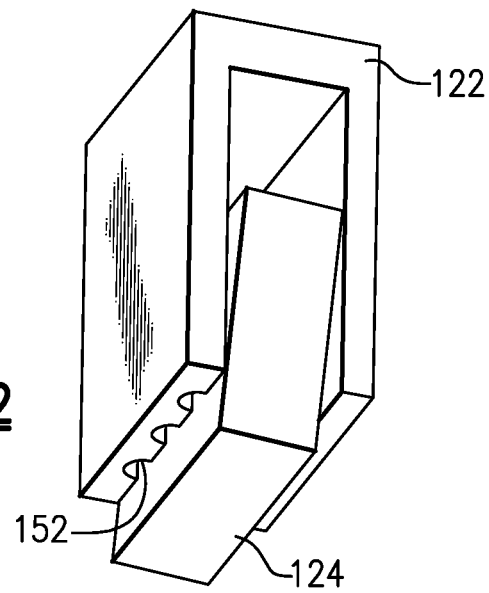
FIG. 22 is a schematic view of a portion of the pressure regulated piston seal assembly of FIG. 20, wherein the piston ring is rotated relative to the piston ring seal housing, in accordance with one or more embodiments shown or described herein.
Figure 23:
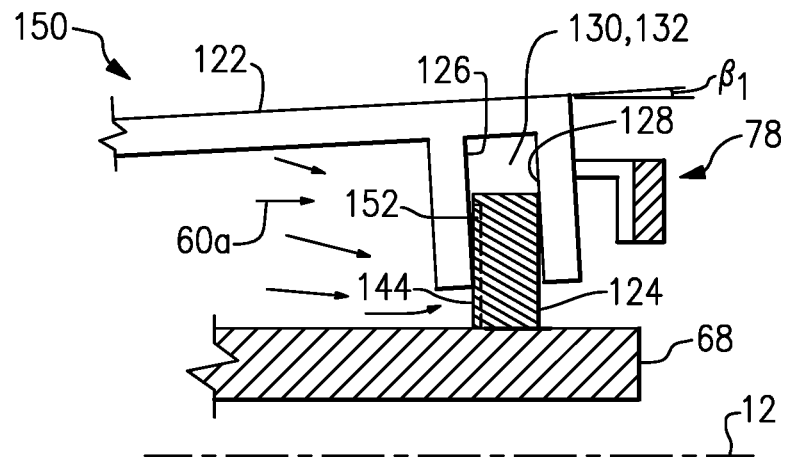
FIG. 23 is a schematic view of another embodiment of a pressure regulated piston seal assembly for a combustor liner, wherein the piston ring seal housing is rotated relative to the piston ring, in accordance with one or more embodiments shown or described herein.
Figure 24:
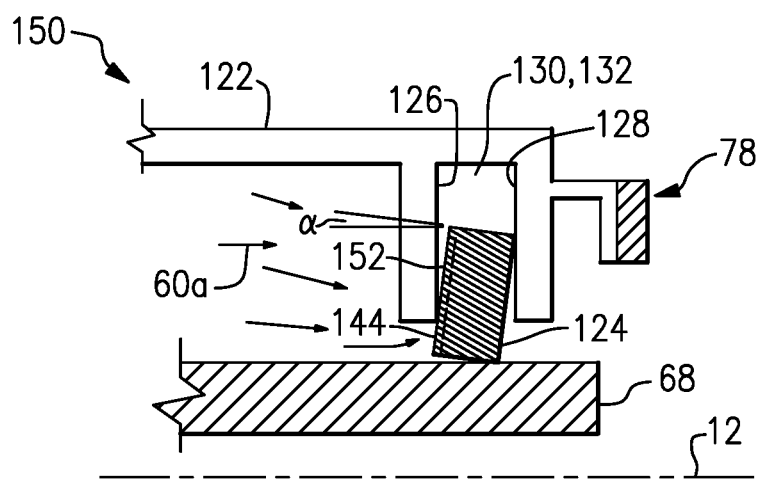
FIG. 24 is a schematic view of the pressure regulated piston seal assembly of FIG. 23, wherein the ring is rotated relative to the piston ring seal housing, in accordance with one or more embodiments shown or described herein.
Figure 25:
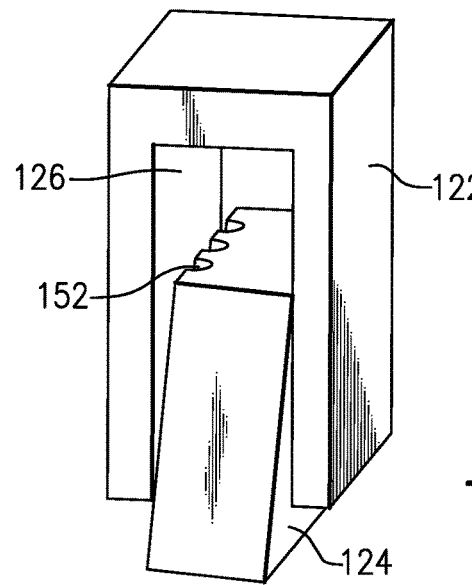
FIG. 25 is a schematic view of a portion of the pressure regulated piston seal assembly of FIG. 24, wherein the piston ring is rotated relative to the piston ring seal housing, in accordance with one or more embodiments shown or described herein.
Figure 26:
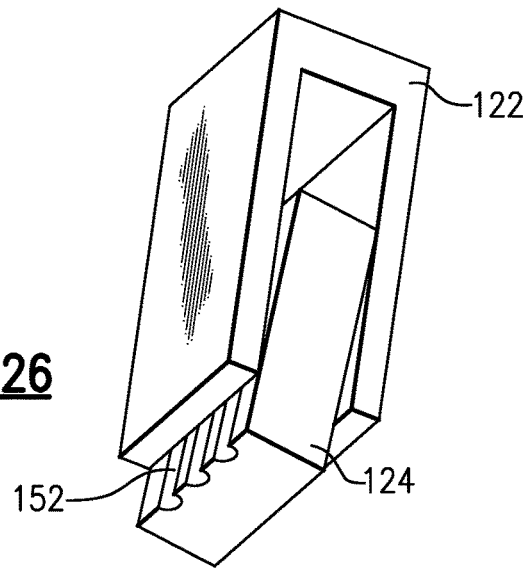
FIG. 26 is a schematic view of a portion of the pressure regulated piston seal assembly of FIG. 24, wherein the piston ring is rotated relative to the piston ring seal housing, in accordance with one or more embodiments shown or described herein.
Figure 27:
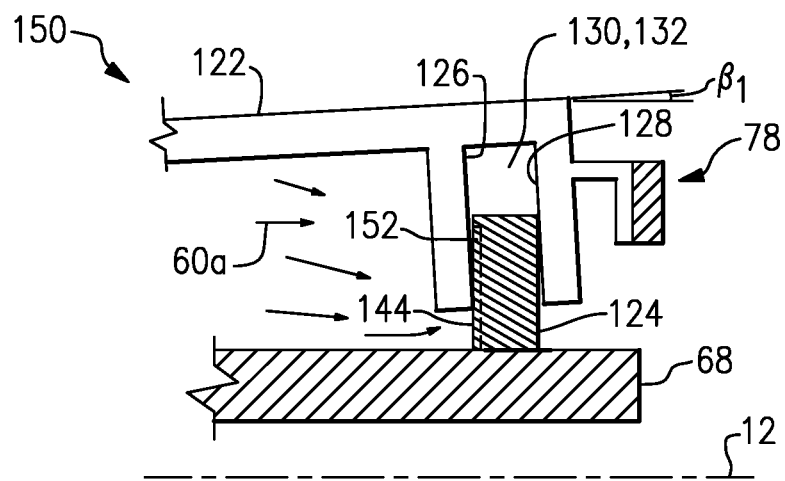
FIG. 27 is a schematic view of an embodiment of a pressure regulated piston seal assembly for a combustor liner, wherein the piston ring seal housing is rotated relative to the piston ring, in accordance with one or more embodiments shown or described herein.
Figure 28:
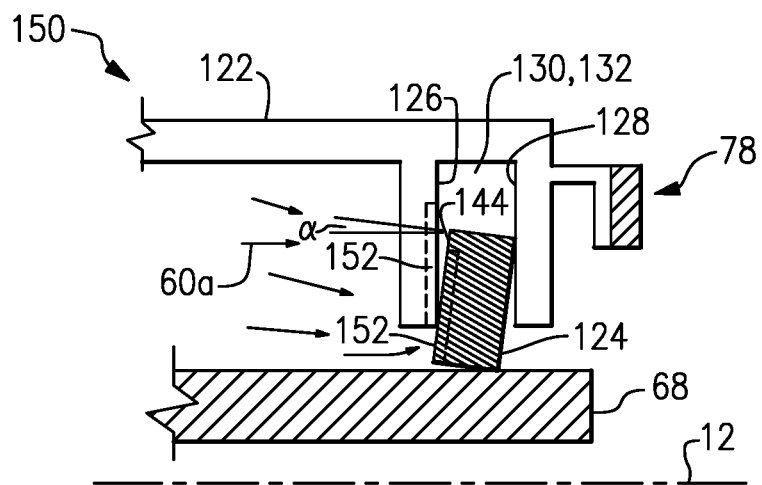
FIG. 28 is a schematic view of the pressure regulated piston seal assembly of FIG. 27, wherein the ring is rotated relative to the piston ring seal housing, in accordance with one or more embodiments shown or described herein.
Figure 29:
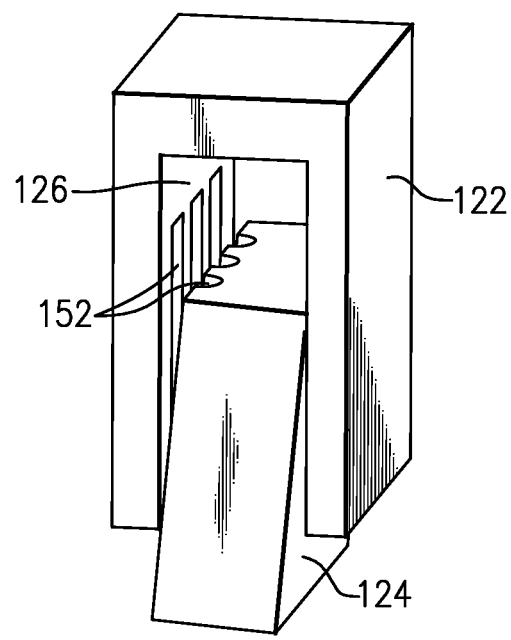
FIG. 29 is a schematic view of a portion of the pressure regulated piston seal assembly of FIG. 28, wherein the piston ring is rotated relative to the piston ring seal housing, in accordance with one or more embodiments shown or described herein.

During a first flight condition (not shown), as the inner flow of the high-pressure ($P_{high}$) bypass airflow 60a enters the piston ring seal housing 122 via the gap, it results in a pressure drop cross the piston ring 124 in the radial direction, thereby engaging the piston ring 124 with the combustor liner 68 and the piston ring seal housing 122, as previously described. In contrast, during a second operating condition, as best illustrated in FIGS. 19, 23 and 27, such as during a takeoff condition, the piston ring seal housing 122 is rotated at an angle "$\beta_1$" relative to the piston ring 124, and more specifically the longitudinal axis 12, due to the high thermal gradient across the piston ring seal housing 98 in the radial direction. As previously indicated, in an embodiment $\beta_1 \neq 0$ degrees. In this instance, the piston ring 124 will block the inner flow of the high-pressure ($P_{high}$) bypass airflow 60a from entering an upper portion 130 of a cavity 132 defined between the front wall 126 and the back wall 128 of the piston ring seal housing 122. The lack of inner flow of the high-pressure ($P_{high}$) bypass airflow 60a into the cavity 132 causes the piston ring 124 to no longer engage with piston seal liner 124 and the seal fails. In this particular embodiment, to address such rotation of the piston ring seal housing 122 during the second flight condition, a plurality of channels 152 are provided on the front wall 126 of the piston ring seal housing 122, as best illustrated in FIGS. 19-22, on the upstream surface 144 of the piston ring 124 as best illustrated in FIGS. 23-26, or on both the front wall 126 of the piston ring seal housing 122 and the upstream surface 144 of the piston ring 124 as best illustrated in FIGS. 27-29. As illustrated in FIGS. 19-22, the plurality of channels 152 are configured to extend into the surface 125 of the front wall 126 of the piston ring seal housing 122. The plurality of channels 152 provides a plurality of high pressure gas flow through conduits to the upper portion 130 of the cavity 132. More specifically, the plurality of channels 152 guide the inner flow of the high-pressure ($P_{high}$) bypass airflow 60*a* directly to top of the piston ring 124 and assure engagement of the piston ring 124 with an outer surface 136 of the combustor liner 68 regardless of the degree of rotation of the piston ring seal housing 122. In an embodiment, the plurality of channels 152 may be manufactured together with the front wall 104 of the piston ring seal housing 122 and no further changes are required for the parts assembly.

Referring now to FIGS. 20-22, 24-26, 28 and 29, in an embodiment the piston ring 124 may rotate relative to the piston ring seal housing 122, and more particularly the longitudinal axis 12, such as during the second operating condition. In this particular embodiment, the piston ring 124 is rotated at an angle "α" relative to the piston ring seal housing 122, and more specifically the longitudinal axis 12, due to thermal stresses. As previously indicated, in an embodiment α≠0 degrees. Similar to the embodiment of FIG. 6, in this instance, the piston ring 124 will block the pathway of the inner flow of the high-pressure ($P_{high}$) bypass airflow 60*a* from the compressor 24 (FIG. 1) from entering an upper portion 130 of a cavity 132 defined between the front wall 126 and the back wall 128 of the piston ring seal housing 122. The lack of inner flow of the high-pressure ($P_{high}$) bypass airflow 60*a* into the cavity 132 causes the piston ring 124 to no longer engage with the combustor liner 68 and the seal fails. To address such rotation of the piston ring 124 during the second flight condition, a plurality of channels 152 are configured to extend into the upstream surface 144 of the piston ring 124. The plurality of channels 152 provides a plurality of high pressure gas flow through conduits to the upper portion 130 of the cavity 132. More specifically, the plurality of channels 152 guide the inner flow of the high-pressure ($P_{high}$) bypass airflow 60*a* directly to top of the piston ring 124 and assure engagement of the piston ring 124 with an outer surface 136 of the combustor liner 68 regardless of the degree of rotation of the piston ring 124. In an embodiment, the plurality of channels 152 may be manufactured together with upstream surface 144 of the piston ring 124 and no further changes are required for the parts assembly. As best illustrated in FIG. 29, in an embodiment, the plurality of channels 152 may be configured to extend both into the front wall 126 of the piston ring seal housing 122 and into the upstream surface 144 of the piston ring 124.

Referring now to FIGS. 30-33, illustrated is yet another embodiment of a pressure-regulated seal assembly, generally referenced 160. The seal assembly 160 is generally defined by a portion of the stage one nozzle 78, as previously introduced in FIG. 2, a piston ring seal housing 122 and a piston ring 124. Similar to the previously described known art of FIGS. 3 and 4, the piston ring seal housing 122 is wider than the piston ring 124, and defines a front gap (not shown) between a front wall 126 of the piston ring seal housing 122 and the piston ring 124 during when the piston ring 124 is pushed against a back wall 128 of the piston ring seal housing 122.

Figure 31:
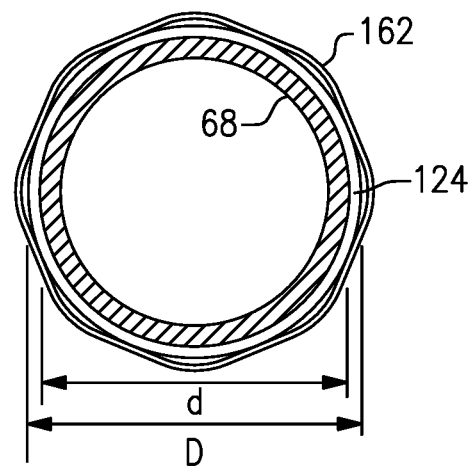
FIG. 31 is an enlarged cross-sectional view of a portion of the pressure regulated piston seal assembly of FIG. 30, along section 31-31, in accordance with one or more embodiments shown or described herein.

During a first flight condition, as best illustrated in FIG. 30, as the inner flow of the high-pressure ($P_{high}$) bypass airflow 60*a* from the compressor 24 (FIG. 1) enters the piston ring seal housing 122 via the front gap 112, it results in a pressure drop cross the piston ring 124 in the radial direction, thereby engaging the piston ring 124 with the combustor liner 68 and the piston ring seal housing 122, as previously described. In this particular embodiment, a cockle spring 162 is provided having an inner circumferential dimension "D" less than an outer circumferential dimension "d" of the downstream end of the combustor liner 26, as indicated in FIG. 31. The cockle spring 162 exerts a radially-inward force on the piston ring 124, as indicated by arrows in FIG. 30, to enhance engagement of the piston ring 124 with the combustor liner 68.

In contrast, during a second operating condition, as best illustrated in FIG. 32, such as during a takeoff condition, the piston ring seal housing 122 is rotated at an angle "$\beta_1$" relative to the piston ring 124, and more specifically the longitudinal axis 12, due to the high thermal gradient across the piston ring seal housing 98 in the radial direction. As previously indicated, $\beta_1 \neq 0$ degrees. In this instance, the piston ring 124 will block the inner flow of the high-pressure ($P_{high}$) bypass airflow 60*a* from entering an upper portion 130 of a cavity 132 defined between the front wall 126 and the back wall 128 of the piston ring seal housing 122. The lack of inner flow of the high-pressure ($P_{high}$) bypass airflow 60*a* into the cavity 132 causes the piston ring 124 to no longer engage with piston seal liner 124 and the seal fails. In this particular embodiment, in addition to the inclusion of one or more sectional through-slots 134, the cockle spring 162 addresses such rotation of the piston ring seal housing 122 during the second flight condition by enhancing the radially-inward force on the piston ring 124, as indicated by arrows in FIG. 32, to enhance engagement of the piston ring 124 with the combustor liner 68.

Referring now to FIG. 33, in another embodiment the piston ring 124 may rotate relative to the piston ring seal housing 122, and more particularly the longitudinal axis 12, such as during the second operating condition. In this particular embodiment, the piston ring 124 is rotated at an angle "α" relative to the piston ring seal housing 122, and more specifically the longitudinal axis 12, due to the thermal stresses. As previously indicated, in an embodiment α≠0 degrees. Similar to the embodiment of FIG. 32, in this instance, the rotation of the piston ring 124 will cause it to block the inner flow of the high-pressure ($P_{high}$) bypass airflow 60*a* from entering an upper portion 130 of a cavity 132 defined between the front wall 126 and the back wall 128 of the piston ring seal housing 122. The lack of inner flow of the high-pressure ($P_{high}$) bypass airflow 60*a* into the cavity 132 causes the piston ring 124 to no longer engage with the combustor liner 68 and the seal fails. In this particular embodiment, to address such rotation of the piston ring 124 during the second flight condition, in addition to the inclusion of a plurality of local bumps 142 on the front wall 126 of the piston ring seal housing 122, the cockle spring 162 further addresses such rotation of the piston ring 124. As previously described, the cockle spring 162 provides a radially-inward force on the piston ring 124, as indicated by arrows in FIG. 33, to assure engagement of the piston ring 124 with the combustor liner 68 regardless of the degree of rotation of the piston ring 124.

As described herein, in known piston seal assemblies, the main reason for piston seal failure is due to the blockage of a gap that is present between the piston ring and the front wall of the piston ring seal housing, so that an upstream high-pressure ($P_{high}$) flow exiting the compressor is not present on the top of the piston ring and there is a lack of sufficient radially-inward force to engage the piston ring on an outer surface of the combustor liner. In an embodiment, where tilting of the piston ring seal housing or piston ring is present, the piston ring will block the gap and more particularly the high-pressure ($P_{high}$) bypass airflow exiting the compressor from entering an upper portion of the cavity. The blocking of the gap results in a lack of pressure drop across the piston ring in the radial direction. As illustrated, the relative rotating of the piston ring seal housing and closure of the gap will result in the piston ring no longer engaging with combustor liner causing the seal to fail.

Accordingly, disclosed is a pressure regulated piston seal for sealing between a combustor liner and a downstream stage one turbine nozzle. The amount of cooling flow through the seal plays an important role in cooling the mechanical parts along the flow path. Sufficient cooling flows are necessary to assure acceptable lifetime of the seal, while too much cooling flow results in waste of compressor air. Meanwhile the extra cooling flow through the piston seal would affect the exit temperature of the combustor liner and further lower the turbine efficiency.

Conventional piston seals typically applied on metal combustor liners were not sensitive to thermal gradient, in that the piston ring seal housing and combustor liner were both formed of a metal and rotated simultaneously. CMC combustor liners experience large relative rotation between the piston ring seal housing and the combustor liner, and result in failure of the seal. The seal assembly disclosed herein provides a solution for CMC combustor liners and associated seal assemblies. The proposed seal assembly assures the piston seal functions well in all flight conditions and thus a controllable cooling flow through the interface of the combustor liner and the stage one turbine nozzle. The manufacturing of the proposed seal assembly does not increase cost and the assembly procedure of the pressure regulated seal disclosed herein is essentially the same as that of conventional piston seals.

Exemplary embodiments of a pressure-regulated seal assembly are described above in detail. The systems and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and enables any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seal assembly to seal a gas turbine hot gas path flow at an interface of a combustor liner and a downstream component in a gas turbine, the seal assembly comprising:
   a piston ring seal housing having defined therein a cavity; and
   a piston ring disposed within the cavity of the piston ring seal housing and circumferentially about the combustor liner, the piston ring responsive to a regulated pressure to secure sealing engagement of the piston ring and an outer surface of the combustor liner, the piston ring including at least one arcuate seal ring segment,
   wherein at least one of the piston ring and the piston ring seal housing comprises one or more features, one of extending into or protruding from, at least one of an upstream surface of the piston ring and a front wall surface of the piston ring seal housing, to define a gap between the upstream surface of the piston ring and the front wall surface of the piston ring seal housing to guide a flow therethrough of a high-pressure ($P_{high}$) bypass airflow exiting an upstream component and exert a radial force on an outermost radial surface of the piston ring in a direction perpendicular to a main gas flow, wherein the gap is configured to extend without interruption from radially outward of the upstream surface of the piston ring into and open at an end of the piston ring seal housing to enable airflow to pass therethrough regardless of an angular position of the piston ring.

2. The seal assembly as claimed in claim 1, wherein the downstream component is a stage one turbine nozzle.

3. The seal assembly as claimed in claim 1, wherein one of the piston ring seal housing or the piston ring is rotated relative to an other of the piston ring seal housing or the piston ring.

4. The seal assembly as claimed in claim 1, wherein the gap comprises one or more channels extending into a front wall to define a conduit to guide the flow therethrough of the high-pressure ($P_{high}$) bypass airflow exiting the upstream component.

5. A gas turbine comprising:
   a combustor liner;
   a stage one nozzle disposed downstream of the combustor liner;
   a piston seal assembly defined at an interface of the combustor liner and the stage one nozzle to seal a gas turbine hot gas path flow, the piston seal assembly comprising:
   a piston ring seal housing having defined therein a cavity; and
   a piston ring disposed within the cavity of the piston ring seal housing and circumferentially about the combustor liner, the piston ring responsive to a regulated pressure to secure sealing engagement of the piston ring and an outer surface of the combustor liner, the piston ring including at least one arcuate seal ring segment,
   wherein at least one of the piston ring and the piston ring seal housing comprises one or more features, one of extending into or protruding from, at least one of an upstream surface of the piston ring and a front wall surface of the piston ring seal housing, to define a gap between the upstream surface of the piston ring and the front wall surface of the piston ring seal housing to guide a flow therethrough of a high-pressure ($P_{high}$) bypass airflow exiting an upstream component and exert a radial force on an outermost radial surface of the piston ring in a direction perpendicular to a main gas flow, wherein the gap is configured to extend without interruption from radially outward of the upstream surface of the piston ring into and open at an end of the piston ring seal housing to enable airflow to pass therethrough regardless of an angular position of the piston ring.

6. The gas turbine as claimed in claim 5, wherein one of the piston ring seal housing or the piston ring is rotated relative to an other of the piston ring seal housing or the piston ring during a takeoff condition.

7. A gas turbine as claimed in claim 5, wherein the gap comprises one or more channels extending into a front wall to channel the flow therethrough of the high-pressure ($P_{high}$) bypass airflow exiting the upstream component to the cavity and wherein the high-pressure ($P_{high}$) bypass airflow exerts the radial force on the piston ring.

8. A gas turbine system comprising:
a compressor section;
a combustor section coupled to the compressor section, the combustor section comprising an annular combustor liner defining an annular combustion chamber coaxial with a longitudinal axis;
a turbine section coupled to the combustor section, the turbine section comprising a stage one turbine nozzle positioned at a downstream end of the annular combustor liner;
a piston seal assembly defined at an interface of the annular combustor liner and the stage one turbine nozzle to seal a gas turbine hot gas path flow, the piston seal assembly comprising:
a piston ring seal housing having defined therein a cavity; and
a piston ring disposed within the cavity of the piston ring seal housing and circumferentially about the annular combustor liner, the piston ring responsive to a regulated pressure to secure sealing engagement of the piston ring and an outer surface of the annular combustor liner, the piston ring including at least one arcuate seal ring segment,
wherein at least one of the piston ring and the piston ring seal housing comprise one or more features, one of extending into or protruding from, at least one of an upstream surface of the piston ring and a front wall surface of the piston ring seal housing, to define a gap between the upstream surface of the piston ring and the front wall surface of the piston ring seal housing to guide a flow therethrough of a high-pressure ($P_{high}$) bypass airflow exiting an upstream component and exert a radial force on an outermost radial surface of the piston ring in a direction perpendicular to a main gas flow, wherein the gap is configured to extend without interruption from radially outward of the upstream surface of the piston ring into and open at an end of the piston ring seal housing to enable airflow to pass therethrough regardless of an angular position of the piston ring.

9. The gas turbine system as claimed in claim 8, wherein one of the piston ring seal housing or the piston ring is rotated relative to an other of the piston ring seal housing or the piston ring during a takeoff condition.

10. The gas turbine system as claimed in claim 8, wherein the gap comprises one or more channels extending into at least one of the upstream surface of the piston ring and the front wall of the piston ring seal housing to channel the flow therethrough of the high-pressure ($P_{high}$) bypass airflow exiting the compressor section to the cavity and wherein the high-pressure ($P_{high}$) bypass airflow exerts the radial force on the piston ring.

\* \* \* \* \*